US011136919B2

(12) United States Patent
Christensen et al.

(10) Patent No.: US 11,136,919 B2
(45) Date of Patent: Oct. 5, 2021

(54) VARIABLE INLET COMPRESSOR DIAGNOSTICS

(71) Applicant: Ford Global Technologies, LLC, Dearborn, MI (US)

(72) Inventors: M. Scott Christensen, Canton, MI (US); Nicholas Herhusky, Dearborn, MI (US); Michael Bastanipour, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 447 days.

(21) Appl. No.: 16/258,010

(22) Filed: Jan. 25, 2019

(65) Prior Publication Data

US 2020/0240330 A1    Jul. 30, 2020

(51) Int. Cl.
| | |
|---|---|
| *F02C 7/36* | (2006.01) |
| *F02B 33/40* | (2006.01) |
| *F02B 37/24* | (2006.01) |
| *F01D 15/10* | (2006.01) |

(52) U.S. Cl.
CPC ............... *F02C 7/36* (2013.01); *F01D 15/10* (2013.01); *F02B 33/40* (2013.01); *F02B 37/24* (2013.01); *F05D 2220/76* (2013.01)

(58) Field of Classification Search
CPC .. F02C 7/36; F02B 33/40; F02B 37/24; F02B 37/10; F01D 15/10
See application file for complete search history.

(56) References Cited

U.S. PATENT DOCUMENTS

| | | | |
|---|---|---|---|
| 4,718,819 A | 1/1988 | Rogo et al. | |
| 4,844,695 A | 7/1989 | Banks et al. | |
| 6,067,800 A | 5/2000 | Kolmanovsky et al. | |
| 6,637,205 B1 | 10/2003 | Ahmad et al. | |
| 6,957,535 B2* | 10/2005 | Sumser .................. | F01D 17/16 60/607 |
| 7,434,399 B2* | 10/2008 | Ishiwatari ........... | F02D 41/0007 60/608 |
| 7,469,577 B2 | 12/2008 | Barton | |
| 7,520,730 B2 | 4/2009 | Yoo et al. | |
| 7,593,828 B2 | 9/2009 | Wang et al. | |
| 8,151,567 B2 | 4/2012 | Rollinger et al. | |
| 9,166,510 B1* | 10/2015 | Himmelmann ........... | F02K 9/48 |
| 10,174,670 B2* | 1/2019 | An .......................... | F02B 33/40 |
| 10,190,487 B1 | 1/2019 | Zeng et al. | |
| 2010/0172745 A1 | 7/2010 | Hodder | |

(Continued)

FOREIGN PATENT DOCUMENTS

| | | |
|---|---|---|
| EP | 2017434 A2 | 1/2009 |
| JP | 2006046246 A | 2/2006 |
| JP | 2011220289 A | 11/2011 |

*Primary Examiner* — Phutthiwat Wongwian
*Assistant Examiner* — Arnold Castro
(74) *Attorney, Agent, or Firm* — Geoffrey Brumbaugh; McCoy Russell LLP

(57) ABSTRACT

Methods and systems are provided for diagnosing an actuator of a variable inlet compressor coupled in an electric turbocharger. During torque transitions, an electrical power consumption of an electric boost assist motor is observed and used to infer an actual compressor speed and pressure ratio across the compressor. By comparing the measured pressure ratio to a compressor map, it may be determined if the actuator is stuck open or stuck closed.

20 Claims, 6 Drawing Sheets

(56) References Cited

U.S. PATENT DOCUMENTS

| | | |
|---|---|---|
| 2014/0377051 A1 | 12/2014 | Sun et al. |
| 2017/0276067 A1 | 9/2017 | Hand, III et al. |
| 2018/0340485 A1* | 11/2018 | Di Gennaro ........ F02D 41/1401 |
| 2019/0078586 A1 | 3/2019 | Zeng et al. |
| 2019/0078587 A1 | 3/2019 | Zeng et al. |
| 2019/0226390 A1* | 7/2019 | McConville ........ F04D 27/0207 |
| 2019/0338697 A1* | 11/2019 | Kelly ..................... F02N 11/04 |
| 2020/0224614 A1* | 7/2020 | Hu ..................... F02D 41/0007 |

* cited by examiner

VARIABLE INLET COMPRESSOR DIAGNOSTICS

FIELD

The present description relates generally to methods and systems for diagnosing a variable inlet compressor coupled to a vehicle engine to reduce surge.

BACKGROUND/SUMMARY

Forcing extra air into an engine enables a turbocharger to increase engine torque and power output density. Turbochargers may include a turbine driven by expanding exhaust gas that is coupled to a compressor via a drive shaft. The compressor may be fluidly coupled to an air intake manifold in the engine connected to a plurality of engine cylinders. The flow of exhaust originating at one or more of the engine cylinders may be directed to a turbine wheel, driving the rotation of the turbine about a fixed axis. The rotation of the turbine drives the rotation of an impeller (e.g., wheel) of the compressor which compresses air into the air intake manifold to increase boost pressure based on engine operating conditions.

Compressor efficiency influences overall engine performance and fuel consumption. For example, lower compressor efficiency may result in slow engine transient response and higher fuel consumption for both steady-state and transient engine operation. At lighter engine loads, when compressor efficiency is reduced, increased turbocharger lag may result during a tip-in. Additionally, light load operation may result in lower compressor efficiency and compressor surge limits may restrict boost pressure rise at low engine speeds.

Various approaches have been developed to improve turbocharger efficiency. As one example, electric assistance may be provided to the turbocharger via an electric boost assist motor. The motor may be coupled to the turbocharger shaft, and may be configured to add positive torque to the shaft to increase compressor speeds during a tip-in, thereby reducing turbo lag. During a tip-out, when a rapid drop in compressor speed is required, the motor may operate as a generator and draw torque from the shaft for charging a battery.

As another example, the compressor or turbine may be configured to have variable geometry. One example of a variable geometry turbocharger is shown by Ahmad et al. in U.S. Pat. No. 6,637,205. Therein, a ring of aerodynamically shaped vanes may control exhaust flow through the turbine. Another example approach is shown by Hodder in U.S. 2010/0172745. Therein, a compressor is configured with adjustable inlet guide vanes. Still other approaches may include active casing treatments and shroud cases for turbochargers. For example, Sun et al. disclose, in US 2014/0377051, an actuatable annular disk with choke slots whose alignment is varied to vary the amount of air drawn into the compressor.

However, the inventors herein have recognized potential issues with such systems. Irrespective of their configuration and design, such variable inlet compressors may need to be periodically and reliably diagnosed to avoid surge. In particular, when an inlet to a compressor of a turbocharger is restricted, the mass air flow through the turbocharger is reduced. This allows for shifting of the surge margin to allow for greater pressure ratios at lower mass airflow. However, if the actuator enabling restriction of the compressor inlet is stuck closed, high end performance would be diminished for the engine. In addition, the compressor can incur potential degradation due to over-speeding. Potential damage to the turbocharger assembly can result in degraded engine performance and warranty issues.

In one example, the issues described above may be addressed by a method for an engine comprising: indicating degradation of an actuator coupled to a variable inlet compressor of an electric turbocharger based on electrical power usage of an electric boost assist motor of the turbocharger following a commanded change in position of the actuator. In this way, variable inlet compressor devices may be reliably diagnosed and timely serviced to avoid potential turbocharger degradation.

As one example, a boosted engine may be configured with an electrically assisted turbocharger having a variable inlet compressor (VIC) coupled to an electric motor/generator. The VIC may have a device coupled to an inlet of the compressor for varying a flow restriction through the compressor. During a high mass flow region of operation, such as may occur at mid-high engine speeds and loads, or at an engine load that is above a surge line, the device is commanded open to reduce flow restriction through the variable inlet compressor. However, if the variable inlet compressor were stuck closed when commanded open, the maximum pressure capability of the boosted engine system would be diminished due to choked flow. In addition, the compressor wheel speed would be increased in order to achieve a target pressure ratio. This condition may be diagnosed by the controller observing a back electromotive force (EMF) applied by the turbocharger on the electric motor. The back-EMF may be used to estimate an actual compressor speed which is then compared against a compressor map to determine if the measured pressure ratio (based on the actual compressor speed) is within a pressure ratio range expected for the measured speed. If the measured pressure ratio is lower than expected, then it may be determined that the VIC is stuck closed.

Additionally, the VIC may be diagnosed based on one or more transient operation parameters. In particular, a time-to-torque as well as an amount of electrical power consumed by the electric motor on a transient operation (such as a tip-in) may be observed. If the VIC is more closed than what is commanded, the transient operation will exhibit a faster response time, and a correspondingly lower electrical power consumption (than expected) for reaching a target throttle inlet pressure. This can be measured via a change in the state of charge of a battery powering the electric motor.

In this way, the power profile of an electric motor coupled to a variable inlet compressor can be advantageously leveraged for diagnosing the compressor. The technical effect of measuring electrical power consumption at the electric motor during a high mass flow region of operation is that back-EMF generated at the electric motor can be correlated with a higher than desired compressor speed and pressure ratio resulting from the compressor inlet being more closed than desired. By also measuring the power consumption during a transient increase in torque, a reduction in the time taken to reach a target throttle inlet pressure as well as a corresponding drop in boost assist needed from the electric motor can be correlated with the higher than desired compressor speed resulting from the compressor inlet being more closed than desired. By performing the diagnostics based on a comparison between expected and measured electric power profiles of the electric motor, the variable inlet compressor may be diagnosed without impeding engine operations. By using existing components to diagnose the variable inlet compressor, diagnostics can be reliably performed without the need for dedicated sensors, and associated costs. By identifying and addressing VIC degradation in a timely manner, turbocharger degradation can be preempted and boosted engine performance can be improved.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2A-2B are shown approximately to scale.

DETAILED DESCRIPTION

Figure 1:
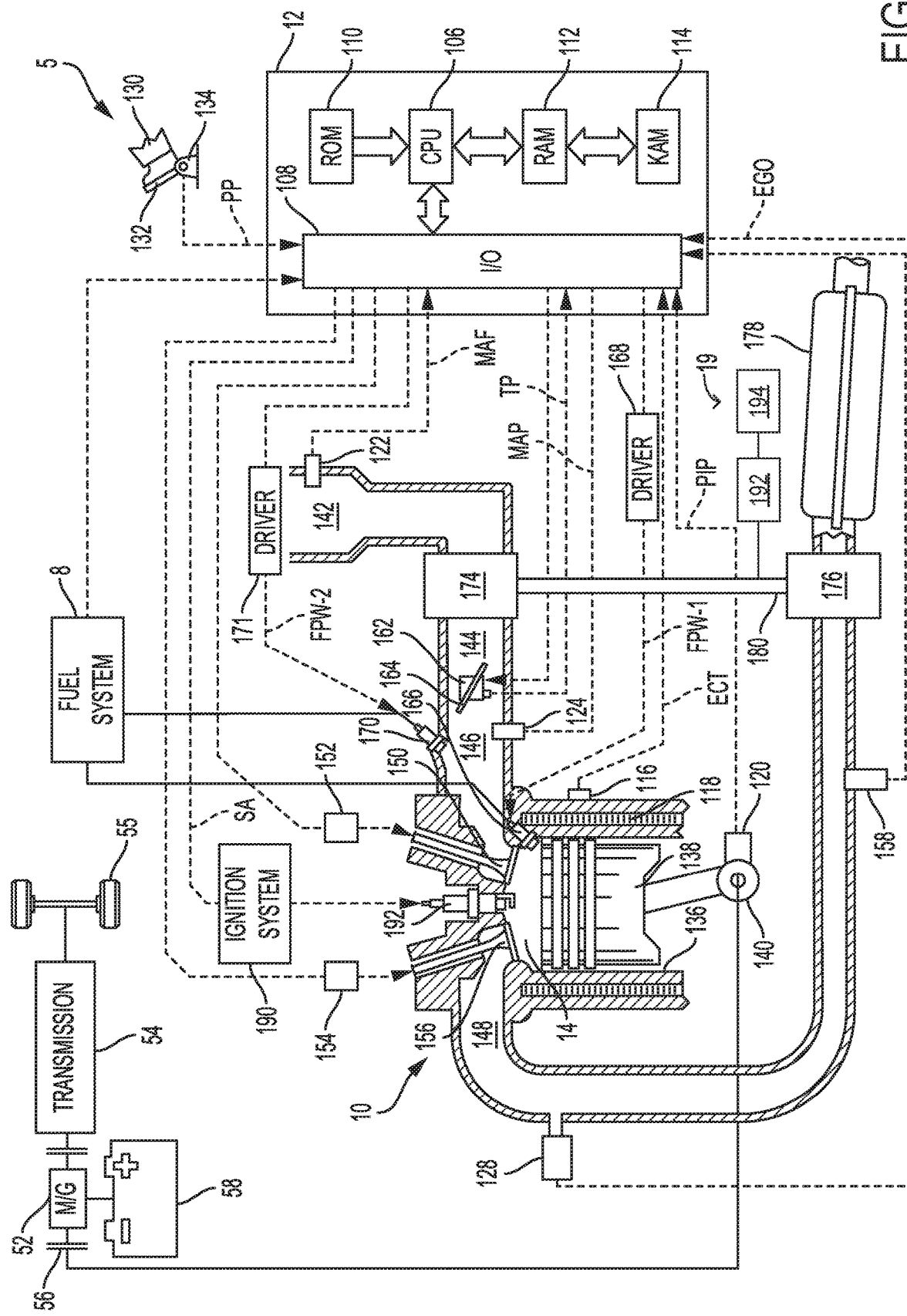
FIG. 1 shows a schematic depiction of an exemplary vehicle system.
Figure 2A:
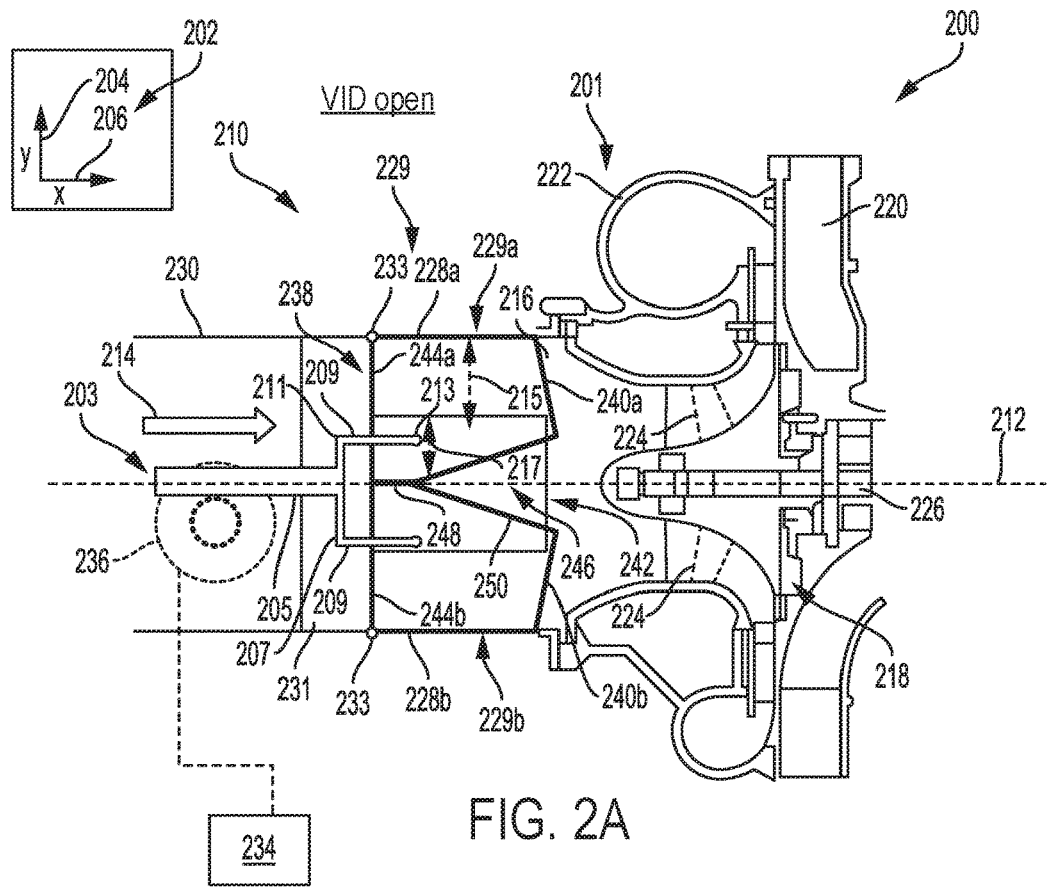
FIGS. 2A-2B show a cut-away view of a turbocharger compressor including a variable inlet device positioned in an inlet conduit of the compressor.
Figure 2B:
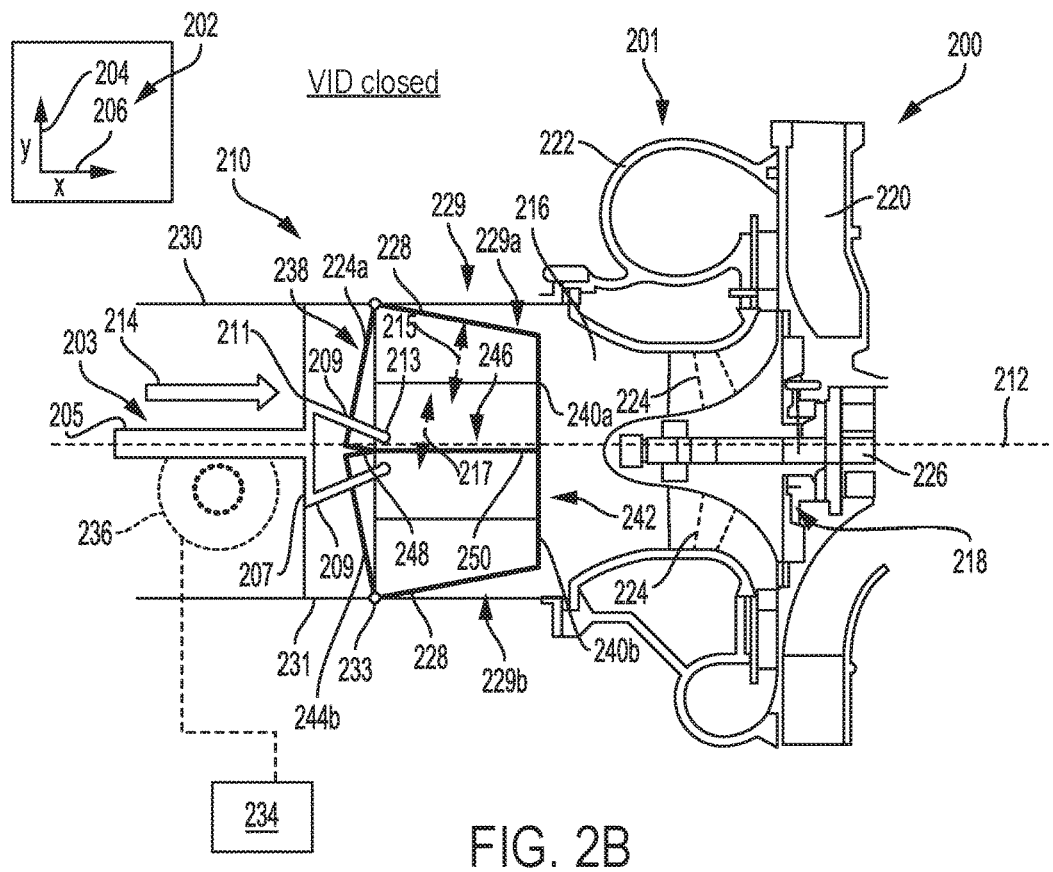
Figure 6:
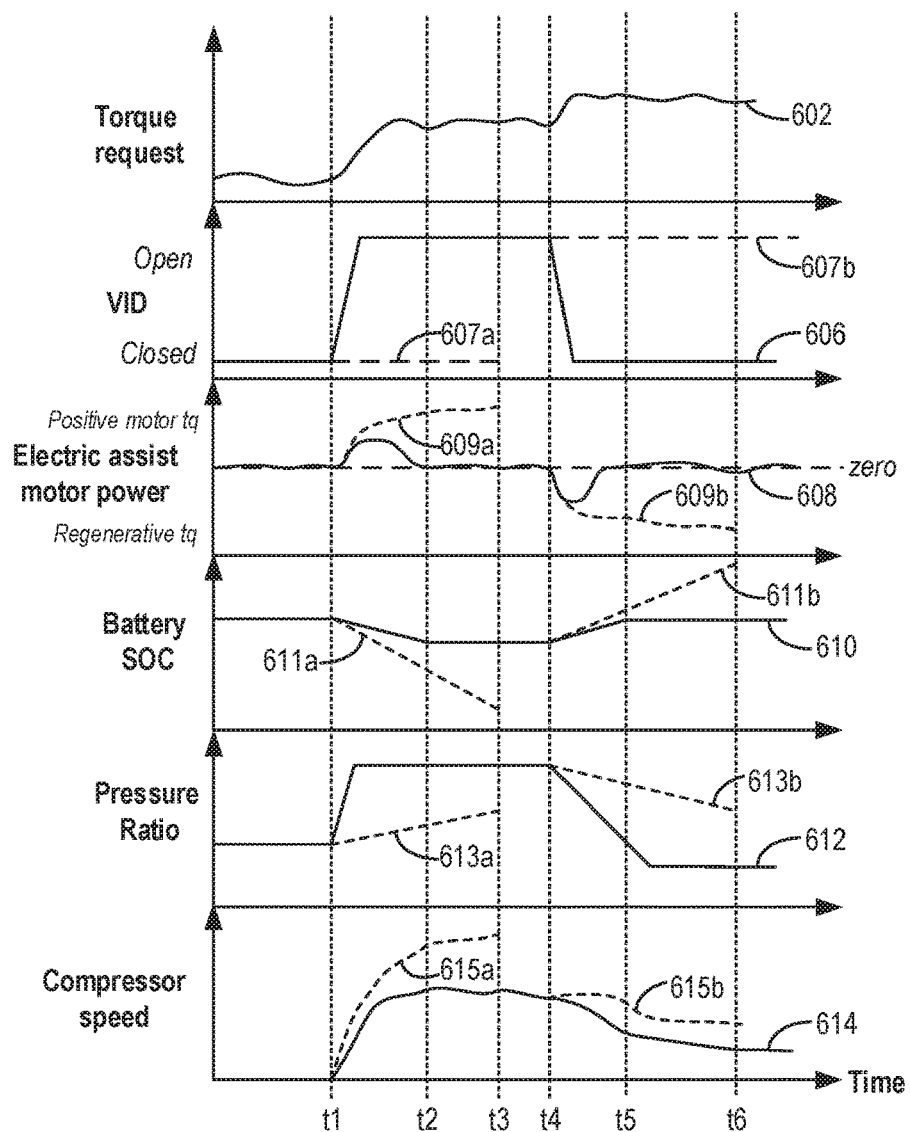
FIG. 6 shows a prophetic example of a variable inlet device diagnostic.
Figure 7:
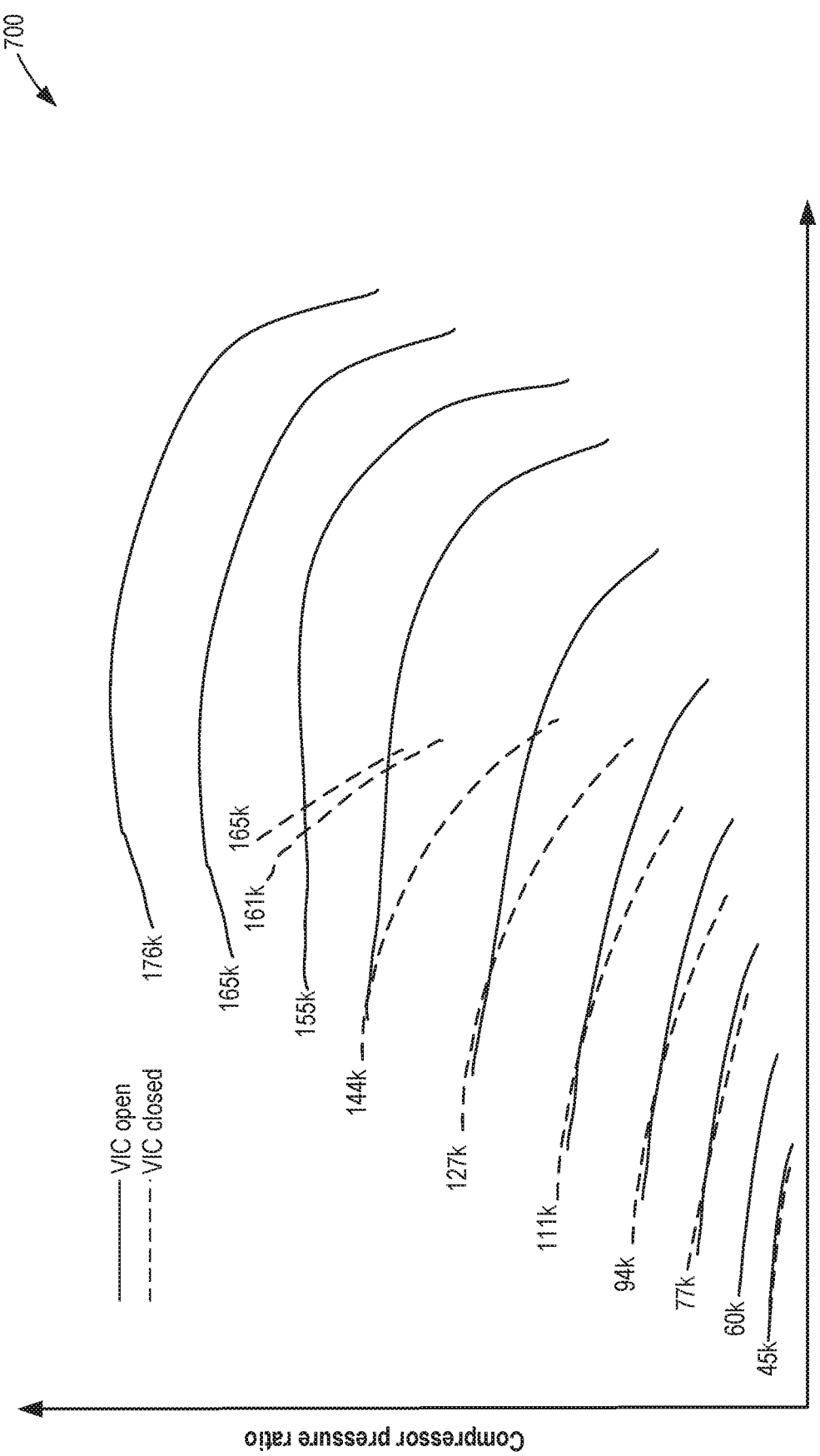
FIG. 7 shows an overlap of compressor ratio maps for VID open and VID closed conditions.

The following description relates to systems and methods for a boosted engine system having an electrical turbocharger with a variable inlet compressor, such as the engine system of FIG. 1. The variable inlet compressor may include a variable inlet device (VID) disposed within an inlet conduit of the compressor, which can be actuated open or closed to vary an amount of flow restriction into the compressor, as shown at FIGS. 2A-2B. A controller may perform a control routine, such as the example routine of FIG. 3, to periodically diagnose the VID during boosted engine operation at high loads. The controller may rely on a comparison of compressor speed and pressure ratio inferred from a measured back-EMF applied on a boost assist motor relative to an expected value, such as based on the maps of FIGS. 4-5, and 7. A prophetic example of VID diagnostics is shown at FIG. 6. In this way, a variable inlet compressor may be reliably diagnosed and serviced in a timely manner.

Turning now to FIG. 1, an example embodiment of a cylinder 14 of an internal combustion engine 10 is illustrated, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine or an electric vehicle with only an electric machine(s). In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via a series of intake air passages 142, 144, and 146. Intake air passage 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger 15, including a compressor 174 arranged between intake passages 142 and 144 and an exhaust turbine 176 arranged along an exhaust passage 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

Turbocharger 15 may be further configured as an electric turbocharger having an electric motor 192 (herein also referred to as an electric assist motor or electric boost assist motor) configured to provide electric assistance to the compressor, turbine, or turbocharger shaft. In the depicted example the electric motor 192 is coupled to shaft 180 although in other examples, the electric motor may be selectively coupled to the compressor 174 or the turbine 176. Electric motor 192 may be powered by an on-board energy storage device, such as system battery 194. Electric motor 192 may be additionally or alternatively powered by an alternator (not shown) coupled to engine 10.

Electric motor 192 may be configured as a motor-generator. Thus, during conditions when electric assistance is required for boost build-up, the electric motor may provide positive torque to drive the centrifugal compressor of the turbocharger shaft 180, to improve the transient boost pressure delivery. However, the electric motor is also capable of energy recuperation by "braking" the motor shaft. Therein, negative torque may be applied to the compressor (or shaft), reducing the compressor speed and concurrently charging the system battery 194 coupled to the motor. An amount of electrical power delivered to electric motor 108 may be varied in order to adjust the output of the turbocharger. In one example, the amount of electric power delivered to electric motor 192 may be increased to provide positive torque to shaft 180 to increase the speed of compressor 174 during a transient increase in torque demand, such as a pedal tip-in. As a result of the electrical assistance, compressor 174 of turbocharger 19 may be rapidly spun up, reducing turbo lag. In another example, an amount of electric power may be generated by electric motor 192 acting as a generator to provide negative torque to shaft 180 to decrease the speed of compressor 174. As a result of the regenerative action, turbine 176 may be rapidly spun down, reducing overboost.

Figure 3:
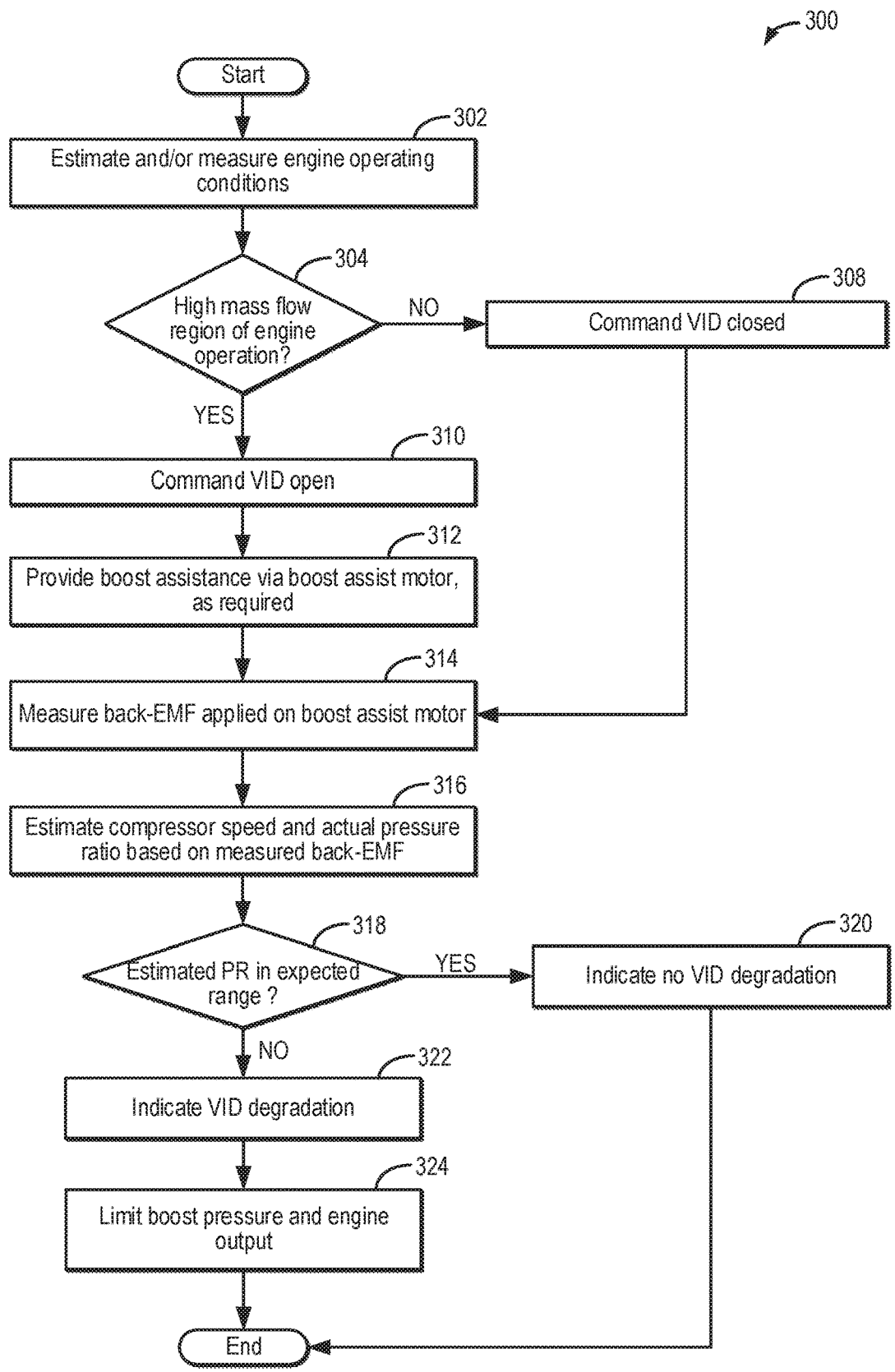
FIG. 3 shows a flow chart of a method for diagnosing a variable inlet device during mass flow conditions.

Compressor 174 may be configured as a variable inlet compressor having an inlet through which flow can be variably restricted. As elaborated with reference to FIGS. 2A-2B, compressor 174 may include a variable inlet device (VID) coupled to an intake conduit of the compressor, the VID actuatable between open and closed positions. In the open position, mass flow of aircharge entering the compressor is increased. In the closed position, mass flow of aircharge into the compressor is limited or restricted. As depicted at FIG. 3, controller 12 may intermittently diagnose the VID to ensure turbocharger performance. Therein, after commanding the VID to an open position during high mass flow conditions, an electrical power consumed by the electric boost assist motor 192 may be monitored, and used to infer if the VID is stuck closed when commanded closed.

As such, various methods may be used to measure the back-EMF without departing from the scope of this approach. As an example, a method for back-EMF estimation may be selected based on how the motor is being driven and/or how the DC motor is being switched. Typically, the supplier of the electronic turbocharger may provide an interface to the back EMF based RPM.

For instance, if the controller is controlling the DC motor with a FET as a sink, then the back EMF can be measured directly with an analog-to-digital controller (ADC) connected to the negative side of the DC motor so long as it is only sampled during the parts of the PWM cycle that are not grounding the DC motor. Back EMF is typically measured with a voltage difference across the motor itself, but cannot be measured when it is being driven directly. So the controller will wait until the motor is either not grounded or not connected to a source voltage (due to pulse width modulation, PWM).

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

Exhaust passage 148 can receive exhaust gases from other cylinders of engine 10 in addition to cylinder 14. An exhaust gas sensor 128 is shown coupled to exhaust passage 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock. In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake passage 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust passage 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature and infer a temperature of catalyst 178 based on the signal received from temperature sensor 158.

Controller 12 receives signals from the various sensors of FIG. 1 and employs the various actuators of FIG. 1 to adjust engine operation based on the received signals and instructions stored on a memory of the controller. For example, upon receiving signals from various sensors, the engine controller may send control signals to an actuator to alter the position of a variable inlet device (VID) of the compressor 174. The signal may tell an actuator of the VID to adjust the VID from an open to a closed position or a closed to an open position in response to a current engine speed and engine load relative to a surge threshold and/or choke threshold of the compressor. As another example, controller 12 may receive signals from electric boost assist motor 192 and associated battery 194 which indicate a back-EMF applied on the motor 192 when the VID is in a commanded position. Based on the applied back-EMF, the controller may calculate an actual compressor speed and compare it to an expected compressor speed and pressure ratio to infer if the VID is stuck in a position different from the commanded position.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Turning now to FIGS. 2A-2B, detailed views of a variable inlet compressor 201 having a variable inlet device for adjusting a flow restriction there-through is shown. In one example, variable inlet compressor 201 may include compressor 174 of FIG. 1. It will be appreciated that herein VIC may also be referred to herein as variable inlet guide vanes (VIGV).

In FIGS. 2A-2B, a schematic 200 of a cut-away (e.g., cross-sectional) views of a compressor 201, including the variable inlet device (VID) 210, are depicted. A set of reference axes 202 is provided for comparison of views shown, indicating a "y" vertical direction 204 and an "x" horizontal direction 206. A central axis 212 of the compressor 201 is included, about which an impeller 218 is rotatable. Central axis 212 may also be a central axis of an inlet conduit 216 of the compressor 201, and the direction of gas flow through the compressor is indicated by an arrow 214. Elements of compressor 201 may be described in the direction of gas flow 214 through the compressor 201 and any element in the path of gas flow relative to a reference point is considered downstream of the reference point. Conversely any element positioned in the reverse direction of gas flow relative to a reference point is upstream of the reference point.

Compressor 201 may include the inlet conduit 216, the impeller 218, a diffuser 220, and a volute 222. The impeller 218 may have a plurality of impeller blades 224 and may be connected to a turbine via a shaft 226 that drives the rotation of the impeller 218 around the central axis 212 of the compressor 201. Gas flow (e.g., intake air from an intake passage such as intake passage 142 shown in FIG. 1) may be drawn into the inlet conduit 216 due to the rotation of the impeller 218 and flow through the VID 210, arranged upstream of impeller 218, before continuing past the impeller 218, accelerating through the diffuser 220, and collecting in the volute 222. Deceleration of gas flow in the volute 222 may cause an increase in pressure in the volute 222, resulting in gas flow to the intake manifold.

The gas flow to the intake manifold may be varied by the operation of the VID 210 within the inlet conduit 216 of the compressor 201. In the absence of the VID 210, flow through the compressor may be a function of the amount of air drawn in through the intake passage, such as intake passage 142 of FIG. 1, without any additional control of the amount of gas entering the compressor 201. The arrangement of the VID 210 in the direct path of gas flow may thus have a substantial impact on regulating flow through the compressor 201, adjustable according to engine operating conditions.

Specific details of the orientation and geometry of the VID 210 will now be described. As shown in FIGS. 2A-2B, the VID 210 spans across an entirety of the inlet conduit 216. VID 210 includes a pair of shells 229, including a first shell 229a and a second shell 229b. The pair of shells 229 have outer surfaces 228 that together form a passage centered about the central axis 212 through which intake air may flow. Specifically, the outer surfaces 228 of the pair of shells 229 may be in contact with an inner wall 230 of the inlet conduit 216 when the VID 210 is in the open position, as shown in FIG. 2A. Additionally, an entirety of VID 210 is arranged upstream of an entirety of impeller 218, including a leading edge of the impeller blades 224. An electric motor 236, in electronic communication with a controller 234 (which may be the same as or similar to the controller 12 shown in FIG. 1), is mechanically coupled to a bar mechanism 203. Based on one or more electronic signals received from the controller 234, the electronic motor 236 may be instructed to pivot a set of arms 209 of the bar mechanism 203 that are coupled to the VID 210 to actuate the VID 210 between open and closed positions.

Other actuators and motors are conceivable for the operation of the VID 210 but the bar mechanism 203 may be a suitable actuating device for the bi-valved configuration of the VID 210. The bar mechanism 203 may include a stem 205, aligned with the central axis 212 of the compressor 201, that is connected at an end to a mid-point of a connecting bar 207, arranged perpendicular to the central axis 212. The set of arms 209 may be attached at a set of first ends 211 to the connecting bar 207 and at a set of second ends 213 to the pair of shells 229 of the VID 210. The arms 209 may be rotated about joints between the first ends 211 and the connecting bar 207 so that the second ends 213 of the arms 209 may pivot towards and away from the central axis 212.

FIG. 2A shows a first schematic 200 of compressor 201 and VID 210 in the open position. In the open position, the second ends 213 of the arms 209 of VID 10 are pivoted away from the central axis 212. First shell 229a includes a first outlet shell end 240a and second shell 229b includes a second outlet shell end 240b. Both the first and second outlet shell ends 240a and 240b are arranged at an outlet end 242 of the VID 210. The outlet end 242, as well as the first and second outlet shell ends 240a and 240b, may be arranged downstream in the inlet conduit 216 of the inlet end 238. The inlet end 238 may comprise a first inlet shell end 244a of the first shell 229a and a second inlet shell end 244b of the second shell 229b. The pair of shells 229 may be attached to a base 231 of the VID 210 via a set of hinges 233 that may be arranged opposite of one another in the circumference of the base 231. The set of hinges 233 may be positioned at mid-points along the first and second inlet shell ends 244a and 244b. In the open position, the outer surfaces 228 of the pair of shells 229 may be in face-sharing contact with the inner wall 230 of the inlet conduit 216, forming an inner channel through the VID 210 that may be uniform in diameter from the inlet end 238 to the outlet end 242.

The pair of shells 229 of the VID 210 may have shapes that enable adjustment of the geometry of the inner channel formed by the pair of shells 229 for desired effects on flow. Both the first shell 229a and the second shell 229b of the VID 210 may have a central region 215 and two side regions 217 arranged on either side of the central region 215. The central region 215 extends in a straight line from the inlet end 238 to the outlet end 242 of the VID 210. The side regions 217 are spaced apart from one another on sides opposite the central region 215 and may each have a side wall 246, and each side wall 246 is also a side wall 246 of one of the pair of shells 229. As each shell of the pair of shells 229 has two side regions 217 and each side region of the two side regions has the side wall 246, then each shell of the pair of shells 229 has more than one side wall 246, e.g., each shell of the pair of shells 229 has a first side wall 246 and a second side wall 246. In the schematic 200 illustrated in FIGS. 2A-2B, only the first side wall 246 is shown and thus the ensuing discussion will be in reference to the visible first side wall 246 of both the first shell 229a and second shell 229b. It will be appreciated, however, that the narrative is also representative of the second side wall 246 of each of the pair of shells 229 that is not shown.

The elements of the first side wall 246 will now be described with reference the VID 210 in the open configuration, as shown in FIG. 2A, and to the first shell 229a of the pair of shells 229 for simplicity. It will be appreciated that the description may similarly describe the second shell 229b. A first portion 248 of the first side wall 246 may extend coaxially with the central axis 212 from the inlet end 238 to a mid-point along the length of the VID 210. A second portion 250 may extend from end of the first portion 248, at the mid-point along the length of the VID 210, to the outlet end 242 of the VID 210. The second portion 250 may be angled so that the second portion 250 is angled away from the central axis 212 at the outlet end 242 of the VID 210 and connects the first portion 248 of the first side wall 246 to the outlet shell end 240a. In the open position, the first portion 248 of the first side wall 246 of the first shell 229a may be in edge-sharing contact with the directly adjacent first portion 248 of the first side wall 246 of the second shell 229b. The arms 209 of the bar mechanism 203, attached at the second ends 213 to the pair of shells 229 of the VID 210, may be perpendicular to the connecting bar 207 of the bar mechanism 203.

When the VID 210 is configured in the open position as described above, the inner surfaces of the pair of shells 229 create little to no flow restriction through the VID 210. In contrast, when the VID 210 is in the closed position, as shown in FIG. 2B, the geometry of the inner channel formed by the pair of shells 229 acts as a constriction in the path of gas flow, as indicated by the arrow 214. In the closed position, the arms 209 of the bar mechanism 203 may rotate so that the arms 209 form acute angles relative to the connecting bar 207. Accordingly, the pair of shells 229 of the VID 210, attached to the second ends 213 of the arms 209, may pivot at the set of hinges 233, so that the first and second outlet shell ends 240a and 240b move toward the central axis 212 of the compressor 201. The outer surfaces 228 of the pair of shells 229 may no longer be in face-sharing contact with the inner wall 230 of the inlet conduit 216, but the VID 210 may maintain contact with the inner wall 230 at the set of hinges 233 and the base 231. The pivoting of the shells 229 may alter the alignment of the pair of shells 229 relative to one another, resulting in the edge-sharing contact between the second portion 250 of the first side wall 246 of the first shell 229a and the directly adjacent second portion 250 of the first side wall 246 of the second shell 229b.

When pivoted into the closed position, the first and second outlet shell ends 240a and 240b of the VID 210 together form a continuous, straight edge and a cross-section of the first and second outlet shell ends 240a and 240b, taken in a direction perpendicular to the central axis 212, may be annular. A diameter at the outlet end 242 may be narrower than the diameter at the inlet end 238 of the VID 210 in the closed position. The first portion 248 of the first side wall 246 of the first shell 229a is not in in edge-sharing contact with the first portion 248 of the first side wall 246 of the second shell 229b and the first portion 248 of the first side wall 246 for both the first and second shells 229a and 229b may extend outwards and away from the central axis 212 in a direction opposite to the direction of flow, indicated by arrow 214. In the closed position, the inner surfaces of the pair of shells 229 form a passage through the VID that narrows in the direction of flow, indicated by arrow 214, thereby restricting gas flow.

When the electric motor 236 receives a signal from the controller, in response to an engine operating condition, the electric motor 236 may engage the bar mechanism 203 to pivot the arms 209 to adjust the position of the VID 210 to afford a desired amount of flow through the compressor. For example, when operating in a mid-to-high engine speed and load region, the VID 210 may be actuated to an open position to enable a higher mass flow through the impeller of the compressor. In comparison, when operating in a low-to-mid engine speed and load region, the VID 210 may be actuated to a closed position to enable a lower mass flow through the impeller of the compressor. As elaborated at FIGS. 3 and 6, the controller may command a target position of the VID and then diagnose the VID based on changes to a compressor speed and an electrical power drawn from an electric boost assist motor coupled to a turbocharger shaft. This allows the controller to diagnose if the VID is stuck closed when commanded open, for example.

FIGS. 2A-2B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 3, a method 300 is shown for operating a variable inlet device (VID) coupled positioned in an inlet conduit of a variable inlet compressor of a turbocharger in a boosted engine system. Specifically, the variable inlet device (VID) may be VID 210 shown in FIGS. 2A-2B. The method further enables the VID to be diagnosed during steady-state boosted engine operation. Instructions for carrying out method 300 and the rest of the methods included herein may be executed by a controller (e.g., controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller may employ an electric motor coupled to a bar mechanism with pivotable arms to adjust the VID between an open position (as shown in FIG. 2A) and a closed position (as shown in FIG. 2B). An example of such an actuator coupled to the VID is shown in FIGS. 2A-2B, as described above. The controller may further rely on the output of another electric motor, specifically a boost assist motor (such as boost assist motor 192 of FIG. 1), to diagnose the functionality of the VID.

At 302, the method includes estimating and/or measuring engine operating conditions. Engine operating conditions may include operator torque demand, brake and/or accelerator pedal positions, engine speed, engine load, engine temperatures (such as engine coolant temperature), mass air flow to the engine, intake manifold pressure, a pressure differential across a compressor, boost pressure, a current position of the VID, etc.

At 304, the method includes determining whether current engine operation is in a high mass flow region, such as may occur when the mass flow required based on torque demand is higher than a threshold flow. Higher than threshold mass flow may occur responsive to a higher than threshold torque demand, or an increase in operator torque demand, such as when the engine is operating in a mid-high speed-load region. For example, a high mass flow condition may be confirmed responsive to an operator pedal tip-in. In one example, high mass flow conditions may be confirmed if the requested torque demand at the required air/fuel ratio requires a mass flow that is above a calibrated threshold of 0.7 kg/s. However it will be appreciated that the threshold flow may vary based on engine configuration since mass flow is relative to compressor size and inlet/outlet design.

If the mass flow is above the threshold flow, the method continues to 306 to open the VID. Opening the VID may include the controller sending an electronic signal to an actuator of the VID (such as the electric motor 236 and bar mechanism 203 shown in FIGS. 2A-2B) to either adjust the VID from the closed position to the open position or to maintain the VID in the open position. The open position of the VID is shown in FIG. 2A, as described above. In the open position, an inner surface of the VID does not restrict flow through the VID, from an inlet end to outlet end of the VID. Adjusting the VID from the closed position to the open position may include pivoting a pair of semi-cylindrical shells of the VID, via the actuator coupled to the hinges of the shells, in a direction relative to a central axis of the compressor (about which the impeller rotates) so that the outer surfaces of the shells are in face-sharing contact with the inner walls of the inlet conduit, and a diameter of the outlet end of the VID increases.

After commanding the VID open, the method moves to 312 wherein boost assistance is provided via a boost assist motor, as required. For example, if the throttle inlet pressure or boost pressure after commanding the VID open is not at the target value, then the controller may provide a current to the electric boost assist motor coupled to a turbocharger shaft so as to add positive torque to the shaft, thereby increasing the compressor output. In one example, the current supplied to the electric motor is increased to increase the compressor speed as a difference between the measured throttle inlet pressure and the target pressure increases.

Alternatively, if the engine is operating below the threshold mass flow, the method continues to 308 to close the VID. Lower than threshold mass flow may occur responsive to a lower than threshold torque demand, or a decrease in operator torque demand, such as when the engine is operating in a low-mid speed-load region. For example, a low mass flow condition may be confirmed responsive to an operator pedal tip-out. Closing the VID may include the controller sending an electronic signal to the actuator of the VID to either adjust the VID from the open position to the closed position or to maintain the VID in the closed position. The closed position of the VID is shown in FIG. 2B, as described above. In the closed position, the inner surface of the VID narrows along a length of the VID. Adjusting the VID from the open position to the closed position may include pivoting each shell of the VID, via the actuator coupled to hinges of the shells, so that the outlet end of each shell pivots toward the central axis of the compressor.

While the depicted method adjusts the position of the VID based on mass flow relative to a threshold at 304, it will be appreciated that in other examples, the actuation of the VID may be responsive to engine speed and load relative to a surge threshold. Therein, the controller may compare the current engine load and engine speed to surge line or threshold of an engine speed-load map stored in the controller's memory.

Figure 4:
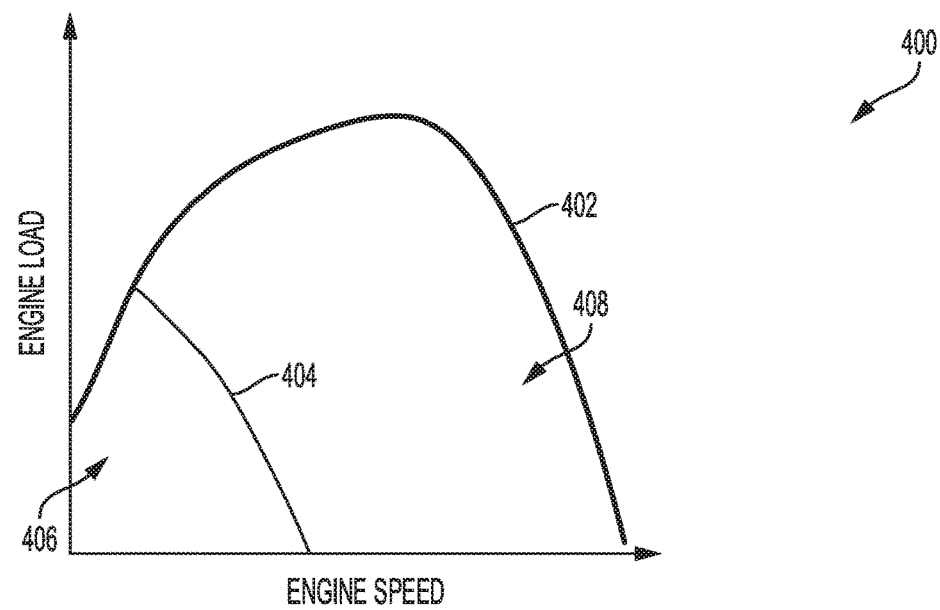
FIG. 4 shows an example engine load and engine speed map for controlling a position of a variable inlet device.

As an example, the controller may refer to map 400 shown in FIG. 4, stored in a memory of the controller. Turning briefly to FIG. 4, map 400 includes an operational boundary line 402. All the possible engine speed and engine load operational points of the engine may be contained within the axes and operational boundary line 402 of map 400. The map 400 also includes a surge threshold line 404. When the engine is operating at an engine speed and engine load point that falls below, or to the left, of the surge threshold line 404, the likelihood of compressor surge may be increased relative to when the engine is operating at an engine speed and engine load point that falls above, or to the right, of the surge threshold line 404. Map 400 therefore includes two distinct areas: a first area 406 which is below, or to the left of, the surge threshold line 404 and a second area 408 which is above, or to the right of, the surge threshold line 404.

When the engine is operating at an engine speed and engine load point that falls within the first area 406, the engine may be operating under a lighter load condition and the controller may actuate the VID to be in the closed position. Conversely, when the engine is operating at an engine speed and engine load point that falls within the second area 408, the engine may be operating under a higher load condition and the controller may actuate the VID to be in the open position. In alternate embodiments, instead of a map of engine speed and engine load, the controller may utilize a map of compressor conditions, such as differential pressure across the compressor and mass air flow through the compressor relative to a surge line to determine which position to adjust the VID into.

Returning to FIG. 3, optionally at 304, the controller may determine whether the engine is operating below the surge threshold using a stored map or look-up table similar to that of map 400 shown in FIG. 4. For example, the controller may determine the current engine speed and engine load and then compare this point to map 400 to determine whether this operating point is above or below the surge threshold. In one example, the surge threshold may be a pre-set surge threshold stored in the map or look-up table. If the engine is not operating below the surge threshold (e.g., the current engine speed and load point is in the second area 408 shown in map 400), the method may continue to 306 to open the VID. Alternatively, if the engine is operating below the surge threshold (e.g., the current engine speed and load point is in the first area 406 shown in map 400), the method continues to 308 to close the VID.

After commanding the VID to one of a closed or open position based on the engine speed-load condition, the method moves to 314 to initiate VID diagnostics. Specifically, at 314, the method includes measuring a back electromotive force (back-EMF) applied on the electric boost assist motor. Since the electric boost assist motor has coils turning inside magnetic fields, an EMF is induced. This EMF, known as the back-EMF, acts against the applied voltage that is causing the motor to spin in the first place, and reduces the current flowing through the coils of the motor.

Back EMF results in a voltage when the motor is in an open circuit. This voltage can be measured directly when the motor is not being driven. DC motors are almost universally driven by PWM control, usually in an H-bridge configuration. This means that while the PWM command is not closing the driving circuit for the electric motor, an ADC can be used to sample voltage across the motor. Current measurement during driving is another option for calculating back EMF.

As such, there is a correlation between RPM and back EMF because the rate that a coil is passing through a magnetic field is proportional to the voltage produced in the coil. This voltage generated within the wire by its passage through the magnetic field makes it so voltage provided by the source in the circuit is not the sole provider of current, and the current flow through the motor is consequently reduced due to the generated counterproductive force. If the circuit is open, there is no current flow and the voltage is innocuous since current through a magnetic field is what generates a force. By measuring this current, which is proportional to the speed, the back EMF and speed relationship can be determined.

At 316, the method includes estimating an actual compressor speed and an actual pressure ratio across the compressor based on the measured back-EMF. In one example, the controller may estimate the actual compressor speed based on the back-EMF using a look-up table or in accordance with equation (1):

$$\omega_{Comp} = K_v \cdot V_{peak} - \text{load}, \quad (1)$$

where load Kv is the motor velocity constant for the motor used and has units RPM/volt, $V_{peak}$ is the voltage supplied to the wires of the motor and the load is effectively zero if sampled in the small window of PWM where the motor is not driven. In this way, every motor may have a unique Kv (as provided by the motor supplier) that converts back EMF voltage to speed (RPM) proportionally. By measuring the back EMF in this manner, the need to estimate the load on the motor from the compressor and turbine wheels is avoided, reducing computation complexity.

As another example, the controller may estimate a motor speed of the electric boost assist motor as a function of the back-EMF applied on the motor, and then estimate the compressor speed as a function of the motor speed, since the boost assist motor is coupled to the turbocharger shaft.

The controller then estimates the actual pressure ratio (PR) across the compressor based on the measured compressor speed. For example, the controller may estimate the pressure ratio based on the actual compressor speed using a look-up table and a turbocharger specific contour map.

An engine controller may control the boost pressure in a feedback manner. For example, a target throttle inlet pressure and/or target mass flow through the compressor may be desired based on the torque demand. If the target throttle pressure is not reached, such as when the turbine is spooling up during a period of turbo lag, the controller may add motor torque to the turbocharger shaft from the electric boost assist motor to increase the compressor speed and meet the target pressure. If the VID is operating as desired, the boost assistance provided from the electric motor may be temporary, and may be discontinued once the turbine has spooled up sufficiently. Else, if the throttle inlet pressure is not reached, the controller may continue to add torque to the shaft from the boost assist motor and continue to spin up the compressor.

At 318, the method includes confirming if estimated pressure ratio is within an expected range. For example, the compressor speed is compared against a compressor map to determine if the measured pressure ratio is within a threshold, or within a threshold of a target pressure ratio expected for the given compressor speed.

Figure 5:
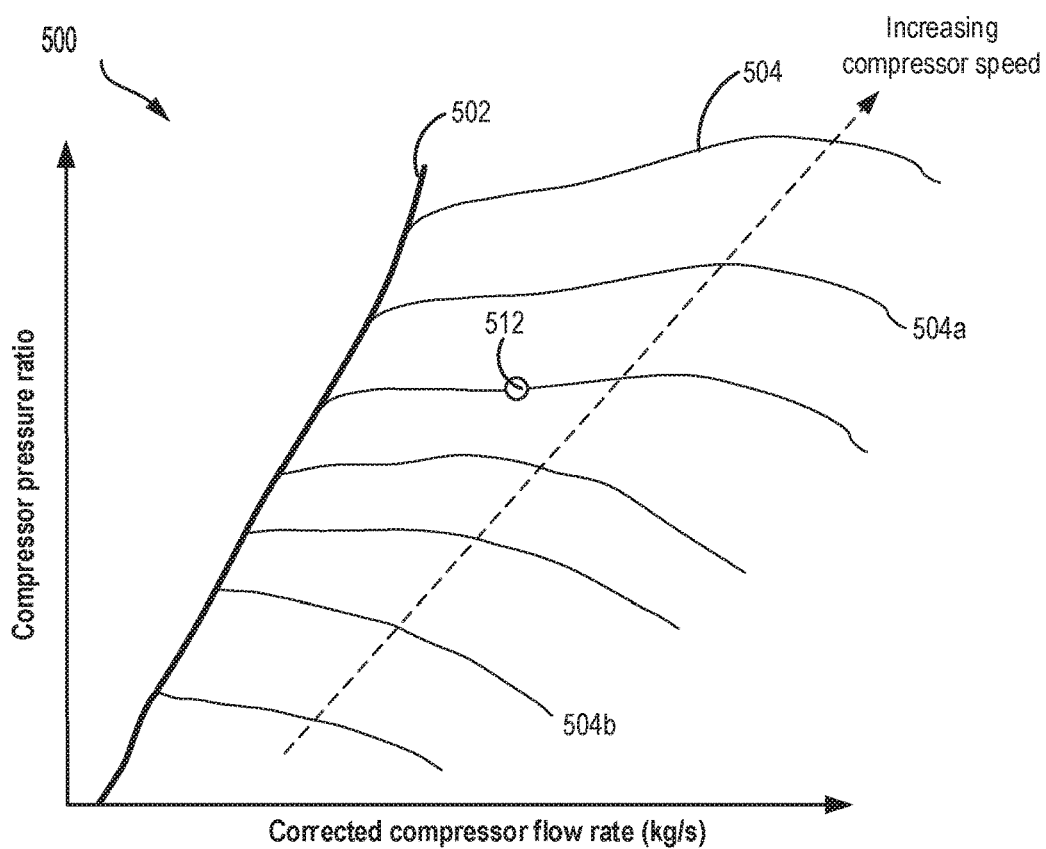
FIG. 5 shows an example compressor pressure ratio map for diagnosing a variable inlet device.

In one example, the controller may use the compressor map 500 of FIG. 5. Map 500 shows compressor pressure ratio (along the y-axis) at different compressor flow rates (along the x-axis) for a turbocharger compressor having an electric motor coupled to its shaft. Line 502 shows a hard surge limit for the turbocharger compressor. Solid lines 504 (only 1 is labeled) depict the constant compressor speed lines of the turbocharger compressor. Compressor operation at flow rates lower than the hard surge limit 502 results in turbocharger compressor operation in a hard surge region with poor drivability, objectionable NVH, and potential degradation of engine performance.

It will be appreciated that the controller may rely on a plurality of such maps. Further, each map may change when the variable inlet is actuated. For example, as shown with reference to plot 700 of FIG. 7, there may be a first map with a first set of values referred to for a VIC open condition (depicted by solid lines at FIG. 7) and a second map with a second set of values referred to for a VIC closed condition (depicted by dashed line at FIG. 7). As another example, the surge line may move to the left (towards a lower compressor ratio value) and the contours of the map may also change with the change in the variable inlet, making it possible to obtain higher pressure ratios with smaller mass flows without incurring surge. This allows the turbocharger to be more dynamic.

With reference to FIG. 5, an example operating point is shown at 510. The operating point 510 corresponds to a desired compressor operation at a higher flow rate and a higher pressure ratio when the compressor is spinning at a speed along speed line 504a. At this operating point, the VID may be actuated open. During a high mass flow condition, when the VID is commanded open, flow through the compressor increases, allowing for a rapid rise in throttle inlet (or compressor outlet) pressure. This results in a high pressure ratio across the turbocharger compressor. Since the controller controls the boost assist motor to provide a target throttle inlet pressure, the inventors herein have recognized that if the VID is stuck closed when commanded open, the compressor impeller speed would be increased by the controller to meet the target throttle inlet pressure (TIP). This would include providing additional boost assist via the boost assist motor. As a result, the current drawn on the boost assist motor would be increased with a corresponding rise in compressor speed but without a corresponding rise in TIP. This would also result in a lower pressure ratio across the compressor for the given boost assist and the given compressor speed.

The expected pressure ratio may be retrieved directly from the map since mass flow, turbine speed, and actual pressure ratio at the given operating point is known based on input from engine sensors. The expected pressure ratio is determined by feeding the known speed and mass flow back into the map. Responsive to the sensor measurement not matching the compressor map values that the controller assumes to be using, it may be inferred that the VIC position is not what was commanded. In particular, if the measured pressure ratio is lower than the expected pressure ratio, the controller may infer that the VIC is stuck closed. Likewise, if the measured pressure ratio is higher than the expected pressure ratio, the controller may infer that the VIC is stuck open. As an example, for an expected pressure ratio, if the compressor speed is 80 k RPM, and the mass flow rate is 0.5 kg/s, for a stuck open scenario, the actual pressure ratio may be higher than the stuck closed scenario. As an example, the pressure ratio may be 1.4 on the open map and 1.2 on the closed map (such as inferred by referring to the maps shown at FIG. 7). With reference to the compressor map of FIG. 5, the controller may command the VIC to a setting where the turbocharger is expected to be at operating point is 512. Then, the controller may use sensor input to determine a measured pressure ratio. If the measured pressure ratio does not agree with the pressure ratio retrieved from the map with respect to operating point 512, it may be inferred that the VIC is stuck. Further, based on whether the measured pressure ratio is higher or lower than the pressure ratio corresponding to operating point 512, the controller may infer if the VIC is stuck open or closed.

In particular, during the high mass flow (high RPM, high load) region of operation, the variable inlet compressor would normally be commanded open. If it were stuck closed, the maximum pressure capability of the system would be diminished due to choked flow and the compressor wheel speed would be increased in order to achieve the same pressure ratios. However, this would not be reflected on the same map because when the VIC is actuated, a different map may would be used as reference. During a low mass flow condition, when the VID is commanded closed, flow through the compressor decreases, allowing for a rapid drop in throttle inlet (or compressor outlet) pressure. This results in a drop in pressure ratio across the turbocharger compressor. Since the controller controls the boost assist motor to provide the target throttle inlet pressure, if the VID is stuck open when commanded closed, the compressor impeller speed would be decreased by the controller to meet the target throttle inlet pressure (TIP). This would include providing reduced boost assist via the boost assist motor, or increasing an amount of regenerative energy generated by the electric boost assist motor operating as a generator to charge a system battery. As a result, the current drawn by the boost assist motor (acting as a generator) would increase without a corresponding drop in compressor speed or TIP. This would also result in a higher pressure ratio across the compressor for the given compressor speed.

Returning to FIG. 3, if the estimated PR is in the expected range at 318, then at 320, the method includes indicating that the VID is not degraded. Else, if the estimated PR is not in the expected range, at 322, the method includes indicating that the VID is degraded. As one example, when the VID is commanded open at high mass flow conditions, responsive to the estimated PR being lower than expected, it may be indicated that the VID is stuck closed. As another example, when the VID is commanded closed at low mass flow conditions, responsive to the estimated PR being higher than expected, it may be indicated that the VID is stuck open.

As an example, the pressure ratio with a stuck closed position will result in a higher compressor RPM to achieve the same pressure ratio, if the same pressure ratio is even achieved at all. The controller may refer to a calibrated compressor map for the expected VIC position, such as shown in FIG. 5. VIC degradation is inferred if the speed and pressure ratios do not agree, as per the referred map. It will be appreciated that there would be a separate map for several VIC positions and the controller would interpolate between them based on an estimated VIC position.

Indicating VID degradation may include setting a diagnostic code and notifying the operator via a malfunction indication light (MIL) that the actuator configured to vary flow restriction through an inlet of the variable inlet compressor of the electric turbocharger is degraded. At 324, a mitigating action may be performed in response to the indication of VID degradation. For example, the controller may limit a boost pressure and engine output torque responsive to the VID being stuck closed. As another example, the controller may limit boost assistance provided via the electric boost assist motor until the VID is serviced. Limiting the boost pressure may include the controller reducing an intake throttle opening to reduce the air flow to the engine. As another example, the controller may command open a compressor bypass valve to either dump all boost pressure from the compressor outlet or limit it in a controlled fashion depending on the level of control possible for the recirculation valve (e.g., based on whether the valve is continuously controlled or passive).

In still further examples, VID degradation may be based on the response time of the turbocharger following the commanding of the VID to a target position. The controller may monitor a time taken for a target TIP or target turbine speed to be reached after commanding actuation of the VID. For example, during a tip-in transient, the controller may command the VID open and monitor the response time taken to meet a target TIP or target turbine speed. If the VID is stuck closed, the transient operation will exhibit a faster response time than expected, resulting in less electrical power being drawn by the electric assist motor to meet the target TIP. The controller may measure this as a drop in current drawn by the electric boost assist motor. Herein, the transient response time refers to throttle inlet pressure targets. An initial response will be faster with the VIC closed but may be limited by choked flow at high flow rates.

As another example, during a first condition, responsive to a first increase in torque demand, the controller may transition the actuator coupled to a variable inlet compressor of an electric turbocharger to a closed position. In comparison, during a second condition, responsive to a second increase in torque demand, the actuator may be transitioned to an open position. During both the first and the second condition, the controller may estimate an actual pressure ratio of the turbocharger from sensed back-EMF of an electric motor coupled to the turbocharger. For example, the current and/or voltage usage of the electric motor for a first duration since commanding the transition of the actuator may be monitored and this may be used to estimate a back-EMF applied on the motor via the compressor. This is then used to infer the actual compressor speed via an algorithm. During the first condition, the controller may refer to a first map of compressor speed and pressure ratio relative to target mass flow through the compressor with the actuator in the open position. If the expected compressor speed and pressure ratio corresponding to the first map does not match the actual compressor speed and pressure ratio estimated via the back-EMF, then the controller may infer that the actuator is stuck closed. In particular, if the actuator is stuck closed when commanded open, the actual pressure ratio may be lower than expected based on the map. In addition, the compressor speed may be higher than expected based on the first map. As another example, during the second condition, the controller may refer to a second map of compressor speed and pressure ratio relative to target mass flow through the compressor with the actuator in the closed position. If the expected compressor speed and pressure ratio corresponding to the second map does not match the actual compressor speed and pressure ratio estimated via the back-EMF, then the controller may infer that the actuator is stuck open. In particular, if the actuator is stuck open when commanded closed, the actual pressure ratio may be higher than expected based on the map. In addition, the compressor speed may be lower than expected based on the map.

Turning now to FIG. 6, a prophetic example of a VID diagnostic of a turbocharger is shown. Map 600 depicts an operator torque request at plot 602. In one example, the operator torque request is received via an accelerator pedal. Compressor speed for the electric turbocharger is shown at plot 614. The position (open or closed) of a VID coupled to a compressor of the electric turbocharger is shown at plot 606. Motor power provided by an electric boost assist motor coupled to a shaft of the electric turbocharger is shown at plot 608. Positive motor torque includes electric motor operation in a motoring mode with electrical power being drawn by the motor from a system battery to add torque to the shaft. Regenerative (or negative) motor torque includes electric motor operation in a generating mode with torque being removed from the shaft to generate electrical power which is stored in the system battery. A state of charge (SOC) of the system battery is shown at plot 610. A pressure ratio across the compressor resulting from the combined operation of the VID, the turbine, and the boost assist motor, is shown at plot 612. All plots are shown over time along the x-axis.

Prior to t1, the engine is operating at low loads responsive to a smaller torque demand (plot 602). The engine is operating with natural aspiration and without boost at this time, as indicated by the compressor speed (plot 614). Due to the need for a smaller mass flow through the compressor, the VID is actuated to the closed position (plot 606). At this time, no boost assist is required from the motor and therefore no motor torque is being provided (plot 608). As a result of no motor torque from the boost assist motor, the battery SOC remains constant (plot 610). The smaller mass flow through the compressor is reflected by the smaller pressure ratio across the compressor (plot 612).

At t1, the operator torque demand increases, for example, due to a larger than threshold operator pedal tip-in. The higher than threshold tip-in results in a move from engine operation without boost to engine operation with boost. The increased torque demand requires the engine to operate in a mid-high engine speed-load region. A higher mass flow is required through the compressor, and a higher compressor speed is required to meet the torque demand. Accordingly, the VID is actuated from the closed position to an open position to increase mass flow through the compressor. In addition, to meet the torque demand while the turbine spools up, positive torque is added to the turbocharger shaft via the boost assist motor. This results in an increase in the compressor speed. If the VID operates as expected, moving to an open position when commanded to, the increased mass flow through the compressor due to the opening of the VID and the spinning of the shaft (and compressor) via the electric motor results in a rise in the pressure ratio across the compressor. In addition, the turbine speed gradually increases. Boost assist is provided during the transient between t1 and t2. At t2, once the compressor speed reaches a target speed that can meet the elevated torque demand, the boost assist is discontinued and target compressor speed is maintained via operation of the turbine. Thereafter, the elevated pressure ratio is maintained via turbocharger operation without boost assist.

However, if the VID were stuck closed when commanded to open (as shown by dashed plot 607a), in an effort to meet a target throttle inlet pressure, the controller may continue to provide positive motor torque via the boost assist motor (as shown by dashed plot 609a). This would result in the compressor continuing to spin up (as shown by dashed plot 615a) while the pressure ratio continues to remain lower than the target pressure ratio (as shown by dashed plot 613a). The prolonged operation of the electric boost assist motor may include the motor continuing to provide positive motor torque to the shaft from t1 to t3 (and beyond), and the battery SOC being drained faster and to a lower value (as shown by dashed plot 611a). At the same time, the turbine speed would also not increase as expected. Thus, during an increase in torque demand requiring an increase in compressor flow, responsive to one or more of a lower than expected pressure ratio, a higher than expected compressor speed, a higher (and longer) than expected power usage of the electric boost assist motor, and a lower than expected turbine speed, the controller may infer that the VID is stuck closed when commanded open.

At t4, the operator torque demand increases again, for example, due to a lower than threshold operator pedal tip-in. The lower than threshold tip-in results in a move from engine operation with a smaller amount of boost to engine operation with a larger amount of boost. The smaller increase in torque demand can bet met via a lower mass flow through the compressor, and a lower compressor speed. Accordingly, the VID is actuated from the open position to a closed position to decrease mass flow through the compressor.

In addition, to reduce turbine over-speeding, regenerative torque is added to the turbocharger shaft via the boost assist motor. This results in an increase in battery SOC as electrical power is generated via the boost assist motor acting as a generator. The regenerative torque also results in a decrease in the turbine speed. If the VID operates as expected, moving to a closed position when commanded to, the decreased mass flow through the compressor due to the opening of the VID and the braking of the shaft (and turbine) via the electric motor results in a drop in the pressure ratio across the compressor. In addition, the compressor speed gradually decreases. Regenerative torque is provided from the motor/generator during the transient between t4 and t5. At t5, once the turbine speed reaches a target speed that meets the lower mass flow, regeneration via the boost assist motor is discontinued and the target compressor speed is maintained via operation of the turbine. Thereafter, the lowered pressure ratio is maintained via turbocharger operation without boost assist from the motor.

However, if the VID were stuck open when commanded to close (as shown by dashed plot 607b), in an effort to meet the target throttle inlet pressure, the controller may continue to provide regenerative torque via the boost assist motor (as shown by dashed plot 609b). However, due to the higher air flow through the less restricted opening of the compressor, the compressor speed would remain higher than desired (as shown by dashed plot 615b) causing the pressure ratio to also remain higher than the target pressure ratio (as shown by dashed plot 613b). The prolonged operation of the electric boost assist motor in the regenerative mode may include the motor continuing to provide regenerative motor torque to the shaft from t4 to t6 (and beyond) and the battery SOC being charged faster and to a higher value (as shown by dashed plot 611b). At the same time, the turbine speed also does not decrease as expected (as shown by dashed plot 605b). Thus, during an increase in torque demand requiring a decrease in compressor flow, responsive to one or more of a higher than expected pressure ratio, a higher than expected compressor speed, a higher (and longer) than expected power draw by the electric boost assist motor, and a higher than expected turbine speed, the controller may infer that the VID is stuck open when commanded closed.

In this way, an actuator configured to vary a flow restriction at an inlet of a variable inlet compressor can be diagnosed using existing components and sensors. The technical effect of measuring an electrical voltage and current going to an electric boost assist motor of a turbocharger having a variable inlet compressor is that the variable inlet device, or actuator, can be reliably diagnosed during boosted engine operation. By correlating the measured electrical power consumption of the electric motor at a target mass flow through the compressor, variation in back-EMF at the electric motor can be associated with the presence of excess or insufficient mass flow through the compressor. Further, the presence of excess or insufficient mass flow through the compressor can be correlated with the functionality of the flow restricting actuator coupled to the inlet of the compressor. By relying on existing components and sensors to diagnose the variable inlet compressor, diagnostic costs are reduced without compromising reliability and accuracy of the diagnostic results. By identifying VIC degradation in a timely manner, the flow restricting actuator can be serviced in a timely manner, pre-empting turbocharger degradation and a drop in engine performance.

One example engine method comprises indicating degradation of an actuator coupled to a variable inlet compressor of an electric turbocharger based on electrical power usage of an electric boost assist motor of the turbocharger following a commanded change in position of the actuator. In the preceding example, additionally or optionally, the method further comprises commanding the actuator open responsive to a larger increase in driver demanded torque requiring an increase in compressor mass flow; and commanding the actuator closed responsive to a smaller increase in the driver demanded torque requiring a decrease in compressor mass flow. In any or all of the preceding examples, additionally or optionally, indicating degradation includes indicating that the actuator is stuck closed when commanded open or indicating that the actuator is stuck open when commanded closed. In any or all of the preceding examples, additionally or optionally, the indicating based on the electrical power usage includes measuring an electric current or electric voltage draw of the motor to estimate a back-electromotive force (EMF) applied on the motor. In any or all of the preceding examples, additionally or optionally, the indicating further includes estimating an actual compressor speed based on the back-EMF; estimating an actual pressure ratio across the compressor based on the actual compressor speed; and comparing the actual pressure ratio to an expected pressure ratio of a compressor flow map. In any or all of the preceding examples, additionally or optionally, the indicating includes: indicating that the actuator is stuck closed when commanded open responsive to the actual pressure ratio being lower than the expected pressure ratio; and indicating that the actuator is stuck open when commanded closed responsive to the actual pressure ratio being higher than the expected pressure ratio. In any or all of the preceding examples, additionally or optionally, the method further comprises, responsive to the indicating that the actuator is stuck closed or stuck open, reducing an intake throttle opening to limit engine torque, retarding spark timing, increasing an opening of an exhaust waste-gate valve, or increasing an opening of a compressor recirculation valve. In any or all of the preceding examples, additionally or optionally, the indicating includes indicating degradation responsive to one or more of a higher than expected and a longer than expected electrical power usage. In any or all of the preceding examples, additionally or optionally, the indicating is further based on a transient response time, the actuator indicated to be stuck closed when commanded open responsive to a reduction in the transient response time following the reduction in driver demanded torque, and the actuator indicated to be stuck open when commanded closed responsive to an increase in the transient response time following the decrease in driver demanded torque.

Another method for an engine comprises: commanding an actuator coupled to a variable inlet compressor of a turbocharger open responsive to increase in driver demanded torque; and indicating actuator degradation based on compressor speed following the commanding, the compressor speed inferred from electrical power usage of an electric boost assist motor coupled to the turbocharger. In any or all of the preceding examples, additionally or optionally, the method further comprises estimating the electrical power usage of the motor based on a measured current and voltage drawn at the motor following the commanding. In any or all of the preceding examples, additionally or optionally, the indicating is further based on a time taken to reach a target throttle inlet pressure following the commanding, the actuator indicated to be stuck closed when the time taken is smaller than expected. In any or all of the preceding examples, additionally or optionally, the method further comprises: responsive to the actuator being stuck closed, reducing an intake throttle opening to limit engine torque. In any or all of the preceding examples, additionally or optionally, indicating based on compressor speed includes indicating degradation responsive to an actual pressure ratio being lower than expected after the commanding, the actual pressure ratio calculated from the inferred compressor speed. In any or all of the preceding examples, additionally or optionally, the method further comprises: commanding the actuator closed responsive to decrease in driver demanded torque; and indicating actuator degradation responsive to the actual pressure ratio being higher than expected after the commanding. In any or all of the preceding examples, additionally or optionally, the method further comprises, responsive to the actuator being stuck open, one or more of reducing an intake throttle opening to limit engine torque, retarding spark timing, increasing an opening of an exhaust wastegate valve, and increasing an opening of a compressor recirculation valve.

Another example engine system comprises: an engine having an intake and an exhaust; a pedal for receiving an operator torque demand; a turbocharger having an intake compressor coupled to an exhaust turbine via a shaft, a variable inlet device coupled to an inlet of the compressor for varying a flow restriction through the compressor; an electric machine coupled to a battery for adding or removing torque to/from the shaft; a sensor for measuring current usage of the electric machine; a throttle inlet pressure sensor coupled upstream of an intake throttle and downstream of the compressor; and a controller with computer readable instructions stored on non-transitory memory that when executed cause the controller to: actuate the variable inlet device from a closed position to an open position responsive to a pedal tip-in; diagnose the variable inlet device based on one or more of an actual pressure ratio across the compressor as inferred from the measured current usage of the electric machine following the actuation, and a time taken to reach a target throttle inlet pressure; and reduce an opening of the intake throttle responsive to a diagnosis of device degradation. In the preceding example, additionally or optionally, the controller includes further instructions to: diagnose that the device is degraded, including the device is stuck closed when actuated open, responsive to one or more of the actual pressure ratio being lower than an expected pressure ratio for a given commanded compressor speed, and the time taken to reach the target throttle inlet pressure being smaller than expected for the commanded compressor speed. In any or all of the preceding examples, additionally or optionally, the controller includes further instructions to: estimate a back-EMF on the electric machine based on the measured current usage; estimate an actual compressor speed based on the estimated back-EMF; and calculate an actual pressure ratio across the compressor from a compressor map using the estimated actual compressor speed as an input. In any or all of the preceding examples, additionally or optionally, the controller includes further instructions to actuate the variable inlet device from the open position to the closed position responsive to a pedal tip-out; diagnose the variable inlet device being stuck open when actuated closed based on one or more of one or more of the actual pressure ratio being higher than the expected pressure ratio for a given commanded compressor speed, and the time taken to reach the target throttle inlet pressure being smaller than expected for the commanded compressor speed; and reduce an opening of the intake throttle responsive to a diagnosis of device degradation.

In another representation, the engine system is coupled in a hybrid vehicle system. In a further representation, the engine system is coupled in an autonomous vehicle system.

In another further representation, a method comprises: during a first condition, responsive to a first increase in torque demand, transitioning an actuator coupled to a variable inlet compressor of an electric turbocharger to a closed position; during a second condition, responsive to a second increase in torque demand, transitioning the actuator to an open position; and during both the first and the second condition, estimating an actual pressure ratio of the turbocharger from sensed back-EMF of an electric motor coupled to the turbocharger; and indicating degradation of the actuator based on the actual pressure ratio relative to an expected pressure ratio.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine method, comprising:
indicating degradation of an actuator coupled to a variable inlet compressor of an electric turbocharger based on electrical power usage of an electric boost assist motor of the turbocharger following a commanded change in position of the actuator.

2. The method of claim 1, further comprising:
commanding the actuator open responsive to a larger increase in driver demanded torque requiring an increase in compressor mass flow; and
commanding the actuator closed responsive to a smaller increase in the driver demanded torque requiring a decrease in compressor mass flow.

3. The method of claim 2, wherein indicating degradation includes indicating that the actuator is stuck closed when commanded open or indicating that the actuator is stuck open when commanded closed.

4. The method of claim 3, further comprising, responsive to the indicating that the actuator is stuck closed or stuck open, reducing an intake throttle opening to limit engine torque, retarding spark timing, increasing an opening of an exhaust waste-gate valve, or increasing an opening of a compressor recirculation valve.

5. The method of claim 2, wherein the indicating based on the electrical power usage includes measuring an electric current or electric voltage draw of the motor to estimate a back-electromotive force (EMF) applied on the motor.

6. The method of claim 5, wherein the indicating further includes:
estimating an actual compressor speed based on the back-EMF;
estimating an actual pressure ratio across the compressor based on the actual compressor speed; and
comparing the actual pressure ratio to an expected pressure ratio of a compressor flow map.

7. The method of claim 6, wherein the indicating includes:
indicating that the actuator is stuck closed when commanded open responsive to the actual pressure ratio being lower than the expected pressure ratio; and
indicating that the actuator is stuck open when commanded closed responsive to the actual pressure ratio being higher than the expected pressure ratio.

8. The method of claim 2, wherein the indicating is further based on a transient response time, the actuator indicated to be stuck closed when commanded open responsive to a reduction in the transient response time following the reduction in driver demanded torque, and the actuator indicated to be stuck open when commanded closed responsive to an increase in the transient response time following the decrease in driver demanded torque.

9. The method of claim 1, wherein the indicating includes indicating degradation responsive to one or more of a higher than expected and a longer than expected electrical power usage.

10. A method for an engine, comprising:
commanding an actuator coupled to a variable inlet compressor of a turbocharger open responsive to increase in driver demanded torque; and
indicating actuator degradation based on compressor speed following the commanding, the compressor speed inferred from electrical power usage of an electric boost assist motor coupled to the turbocharger.

11. The method of claim 10, further comprising estimating the electrical power usage of the motor based on a measured current and voltage drawn at the motor following the commanding.

12. The method of claim 10, wherein the indicating is further based on a time taken to reach a target throttle inlet pressure following the commanding, the actuator indicated to be stuck closed when the time taken is smaller than expected.

13. The method of claim 10, further comprising, responsive to the actuator being stuck closed, reducing an intake throttle opening to limit engine torque.

14. The method of claim 10, wherein indicating based on compressor speed includes indicating degradation responsive to an actual pressure ratio being lower than expected after the commanding, the actual pressure ratio calculated from the inferred compressor speed.

15. The method of claim 14, further comprising:
commanding the actuator closed responsive to decrease in driver demanded torque; and
indicating actuator degradation responsive to the actual pressure ratio being higher than expected after the commanding.

16. The method of claim 15, further comprising, responsive to the actuator being stuck open, one or more of reducing an intake throttle opening to limit engine torque, retarding spark timing, increasing an opening of an exhaust waste-gate valve, and increasing an opening of a compressor recirculation valve.

17. An engine system, comprising:
an engine having an intake and an exhaust;
a pedal for receiving an operator torque demand;
a turbocharger having an intake compressor coupled to an exhaust turbine via a shaft, a variable inlet device coupled to an inlet of the compressor for varying a flow restriction through the compressor;
an electric machine coupled to a battery for adding or removing torque to/from the shaft;
a sensor for measuring current usage of the electric machine;
a throttle inlet pressure sensor coupled upstream of an intake throttle and downstream of the compressor; and
a controller with computer readable instructions stored on non-transitory memory that when executed cause the controller to:
actuate the variable inlet device from a closed position to an open position responsive to a pedal tip-in;
diagnose the variable inlet device based on one or more of an actual pressure ratio across the compressor as inferred from the measured current usage of the electric machine following the actuation, and a time taken to reach a target throttle inlet pressure; and
reduce an opening of the intake throttle responsive to a diagnosis of device degradation.

18. The system of claim 17, wherein the controller includes further instructions to:
diagnose that the device is degraded, including the device is stuck closed when actuated open, responsive to one or more of the actual pressure ratio being lower than an expected pressure ratio for a given commanded compressor speed, and the time taken to reach the target throttle inlet pressure being smaller than expected for the commanded compressor speed.

19. The system of claim 18, wherein the controller includes further instructions to:
actuate the variable inlet device from the open position to the closed position responsive to another pedal tip-in;
diagnose the variable inlet device being stuck open when actuated closed based on one or more of one or more of the actual pressure ratio being higher than the expected pressure ratio for a given commanded compressor speed, and the time taken to reach the target throttle inlet pressure being smaller than expected for the commanded compressor speed; and
reduce an opening of the intake throttle responsive to a diagnosis of device degradation.

20. The system of claim 17, wherein the controller includes further instructions to:
estimate a back-EMF on the electric machine based on the measured current usage;
estimate an actual compressor speed based on the estimated back-EMF; and
calculate an actual pressure ratio across the compressor from a compressor map using the estimated actual compressor speed as an input.

* * * * *